United States Patent
Neely et al.

(10) Patent No.: US 9,758,236 B2
(45) Date of Patent: Sep. 12, 2017

(54) ACTIVE IMPACT FORCE/TORQUE CONTROL FOR AN ELECTROMECHANICAL ACTUATOR

(71) Applicant: EATON CORPORATION, Cleveland, OH (US)

(72) Inventors: John David Neely, Kentwood, MI (US); John Mendenhall White, Hudsonville, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 14/780,344

(22) PCT Filed: May 29, 2014

(86) PCT No.: PCT/US2014/040040
§ 371 (c)(1),
(2) Date: Sep. 25, 2015

(87) PCT Pub. No.: WO2014/194104
PCT Pub. Date: Dec. 4, 2014

(65) Prior Publication Data
US 2016/0072425 A1  Mar. 10, 2016

Related U.S. Application Data

(60) Provisional application No. 61/828,923, filed on May 30, 2013.

(51) Int. Cl.
*H02P 29/032* (2016.01)
*B64C 5/08* (2006.01)
(Continued)

(52) U.S. Cl.
CPC .......... *B64C 5/08* (2013.01); *B64C 5/10* (2013.01); *B64C 13/00* (2013.01); *G05D 15/01* (2013.01);
(Continued)

(58) Field of Classification Search
CPC .. B64C 5/08; B64C 5/10; B64C 13/00; G05D 15/01; G05D 17/02; H02P 29/0033; H02P 29/022; H02P 29/027; H02P 29/032
(Continued)

(56) References Cited

U.S. PATENT DOCUMENTS 5,670,856 A * 9/1997 Le .................. G05D 1/0077
244/194
6,827,311 B2 * 12/2004 Wingett ................ B64C 13/50
244/227

(Continued)

FOREIGN PATENT DOCUMENTS

EP   2148257 A2   1/2010

OTHER PUBLICATIONS

European Patent Office; International Search Report and Written Opinion issued in corresponding International Application No. PCT/US2014/040040. Date of Mailing: Sep. 25, 2014.

*Primary Examiner* — Rita Leykin
(74) *Attorney, Agent, or Firm* — Fishman Stewart PLLC

(57) ABSTRACT

A system that improves on known systems for reducing output torque by a motor in the event of a jam may include an electromechanical actuator (EMA), a motor configured to drive the EMA and a controller. The controller may be coupled to the motor and configured to receive a speed of the EMA and a position of the EMA. The controller may be further configured to determine whether a jam of the EMA is imminent or is occurring according to the EMA speed, EMA position, and a known range of motion of the EMA, (Continued)

and to provide an input signal to the motor to reduce a torque of the motor if a jam of the EMA is imminent or is occurring.

20 Claims, 1 Drawing Sheet

(51) Int. Cl.
  *G05D 15/01* (2006.01)
  *G05D 17/02* (2006.01)
  *H02P 29/024* (2016.01)
  *H02P 5/00* (2016.01)
  *B64C 5/10* (2006.01)
  *B64C 13/00* (2006.01)
  *H02P 29/40* (2016.01)

(52) U.S. Cl.
  CPC .............. *G05D 17/02* (2013.01); *H02P 5/00* (2013.01); *H02P 29/027* (2013.01); *H02P 29/032* (2016.02); *H02P 29/40* (2016.02)

(58) Field of Classification Search
  USPC ........ 318/453, 460, 563, 638, 456; 244/175, 244/173.2; 702/182, 115, 185, 150
  See application file for complete search history.

(56) References Cited

U.S. PATENT DOCUMENTS

| | | | |
|---|---|---|---|
| 7,877,231 B2* | 1/2011 | Bharadwaj | ......... G05B 19/4065 700/21 |
| 8,256,718 B2* | 9/2012 | Fleddermann | .......... B64C 13/16 244/194 |
| 8,928,267 B2* | 1/2015 | Igarashi | ............... G05B 19/416 318/469 |
| 2004/0195441 A1 | 10/2004 | Wingett et al. | |
| 2006/0006824 A1 | 1/2006 | Stridsberg | |
| 2007/0198225 A1 | 8/2007 | Roach et al. | |

* cited by examiner

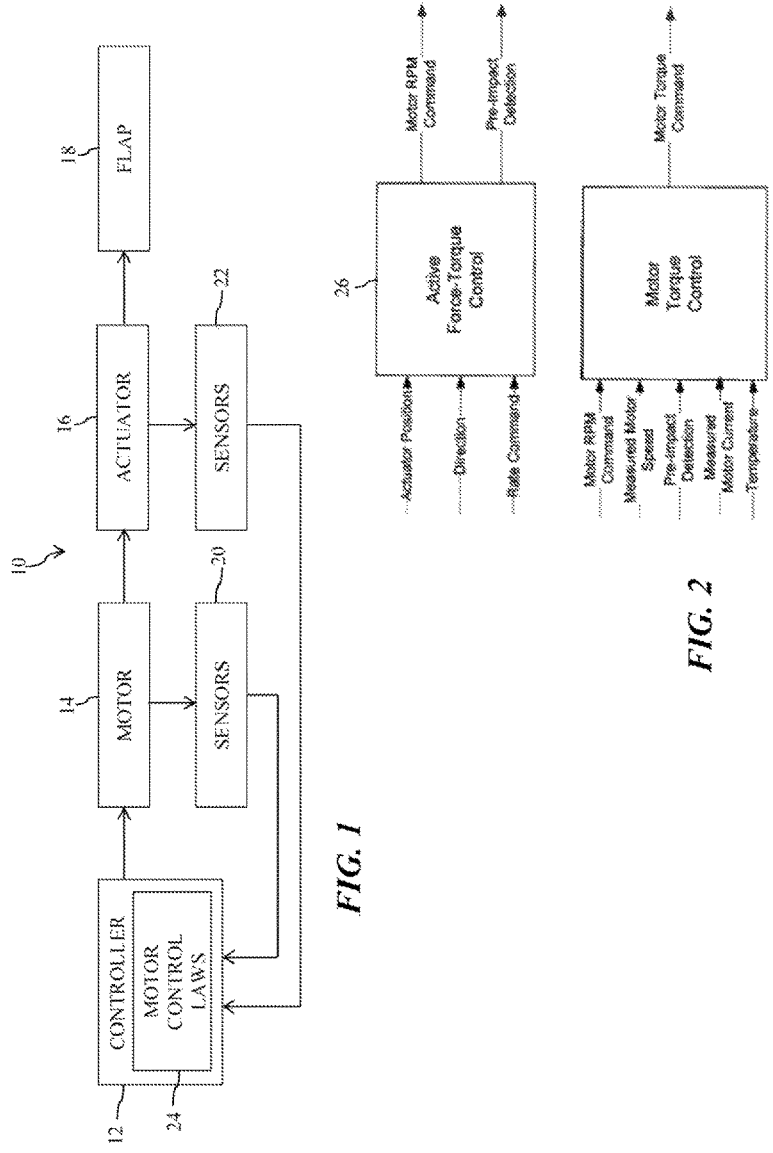

ACTIVE IMPACT FORCE/TORQUE CONTROL FOR AN ELECTROMECHANICAL ACTUATOR

CROSS-REFERENCE TO RELATED APPLICATIONS

This application is a national stage filing based upon International Application No. PCT/US2014/040040, with an international filing date of May 29, 2014, which claims the benefit of U.S. Provisional Application Ser. No. 61/828,923, filed May 30, 2013, the disclosure of which is incorporated herein by reference in its entirety.

BACKGROUND

1. Technical Field

The present disclosure relates generally to electromechanical actuators, including electromechanical actuators for aircraft flap systems.

2. Description of the Related Art

Electromechanical actuators generally have a fixed range of motion. For example, an aircraft flap actuator may have a range of motion corresponding to full extension of the flap on one end and full retraction (i.e., no extension) at the other end. At each end of the range, a condition may occur, sometimes referred to as a "hard jam," in which the actuator reaches the end of its range of motion, but a motor to which the actuator is coupled continues to attempt to drive the actuator. A similar condition, sometimes referred to as a "soft jam," may occur when the motor continues to provide power, but the actuator is jammed within its range of motion because of a misalignment, a mechanical fault in the actuator, or some other mechanical issue. In both a soft jam and a hard jam, the actuator may be de-coupled from the motor to prevent damage to the motor and the actuator by an excess output torque of the motor.

Known solutions for de-coupling the motor from an electromechanical actuator are generally mechanical in nature. For example, a torque brake or a slip clutch may be included in or between the actuator and the motor.

SUMMARY

Mechanical solutions for de-coupling a motor from an electromechanical actuator may be heavy and may vary in performance over a range of temperatures and other environmental factors. In an aircraft application, both weight and environmental tolerance are particularly important considerations. Consequently, reducing the weight and improving the performance consistency over a range of environmental factors by replacing or supplementing mechanical components with electronic controls may be advantageous.

A system that improves on known systems for reducing output torque by a motor in the event of a jam may include an electromechanical actuator (EMA), a motor configured to drive the EMA and a controller. The controller may be coupled to the motor and configured to receive a speed of the EMA and a position of the EMA. The controller may be further configured to determine whether a jam of the EMA is imminent or is occurring according to the EMA speed, EMA position, and a known range of motion of the EMA, and to provide an input signal to the motor to reduce a torque of the motor if a jam of the EMA is imminent or is occurring.

A method for controlling a motor coupled with an electromechanical actuator (EMA) that improves on mechanical methods for reducing output torque by the motor in the event of a jam may include receiving, from one or more sensors coupled with the motor or the EMA, an indication of a speed of the EMA and a position of the EMA. The method may further include determining whether a jam of the EMA is imminent or is occurring according to the EMA speed, EMA position, and a known range of motion of the EMA, and providing an input signal to the motor to reduce a torque of the motor if a jam of the EMA is imminent or is occurring.

BRIEF DESCRIPTION OF THE DRAWINGS

Embodiments of the invention will now be described, by way of example, with reference to the accompanying drawings, wherein:

FIG. 1 is a block diagram view of an aircraft flap system.

FIG. 2 is a block diagram view of a portion of an embodiment of the motor control laws of a controller of the flap system of FIG. 1.

DETAILED DESCRIPTION

Reference will now be made in detail to embodiments of the present disclosure, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims.

Referring to the figures, in which like reference numerals refer to the same or similar features in the various views, FIG. 1 is a block diagram view of an aircraft flap system 10 that improves on flap systems known in the art by providing an electronic means for preventing excess output torque by a motor driving an electromechanical actuator. The system may include a controller 12, a motor 14, an electromechanical actuator 16 (which may be referred to herein as an EMA 16), a flap 18, and a number of sensors 20, 22.

The teachings of the present disclosure are applicable to numerous fields and applications. Thus, although specific embodiments above and below may be discussed with reference to an aircraft flap system 10 for ease of description, such embodiments are not intended to be limiting. Instead, the teachings of the present disclosure may find use in a number of different applications including, but not limited to, different motors and actuators than those illustrated and described herein.

The flap 18, EMA 16, motor 14, and sensors 20, 22 may comprise conventional components known in the art. The EMA 16 may be mechanically coupled to the flap 18 to extend and retract the flap 18 or a portion of the flap 18, and the motor 14 may be mechanically coupled to the EMA 16 and configured to provide power to the actuator 16 to move the flap 18. Of course, as noted above, actuators and motors in a variety of fields and applications may find use with the teachings of the present disclosure, and are not limited to use with flaps or other aircraft components.

A first set of one or more sensors 20 may be coupled with the motor 14 and may be configured to sense or detect a state of one or more variables of the motor 14. For example, but without limitation, the sensors 20 may be provided to sense one or more of the position, speed, and electrical current of the motor 14. The sensors 20 may be configured to provide sensed information to the controller 12.

A second set of one or more sensors 22 may be coupled with the actuator 16 and may be configured to sense or detect a state of one or more variables of the actuator 16. For example, but without limitation, the sensors 22 may be configured to sense one or more of the position and speed of the actuator 16. The sensors 22 may be configured to provide sensed information to the controller 12.

Sensed speed and position of the EMA 16 and the motor 14 may be compared or correlated with each other (i.e., the speed of the actuator 16 may correlate with the speed of the motor 14, and the position of the actuator 16 may correlate with the position of the motor 14). For example, in an embodiment in which the EMA 16 is a linear actuator, a mechanical revolution of the motor 14 may correlate with a fixed linear movement of the EMA 16. Accordingly, to detect the position and speed of the EMA 16, the position and speed of the motor 14 and/or the EMA 16 may be detected.

One or more temperature sensors may be included in the first set of sensors 20, the second set of sensors 22, and/or elsewhere in the system 10. Such temperature sensors may be configured to sense temperatures at one or more locations in the system 10 (e.g., in or around the motor 14). In an embodiment, a sensed temperature may be used to adjust input signals to the motor 14 to account for variations in motor 14 and/or actuator 16 function according to temperature variations. With some embodiments, sensors and adjustments may be provided for other environmental factors as well, in an embodiment.

The controller 12 may be configured to receive as input, among other things, the speed and/or position of the actuator 16 and/or motor 14 and the motor current from the sensors 20, 22 and actuator movement commands from an actuation position controller (e.g., a flight control system computer). The actuator movement commands received by the controller 12 may include a direction and a rate of movement and may be referred to herein as the master movement command. The controller 12 may be further configured to output a signal to drive the motor 14.

The controller 12 may include a set of motor control laws, code, instructions, and/or operational directives (which may be collectively referred to as "motor control laws" and may be generally referenced as element 24) that are or may be configured (e.g., when executed by the controller 12) to initiate or develop a motor drive signal based on input received by the controller 12 and knowledge of, or information or data pertaining to, the motor 14 and/or the actuator 16. Among other functions, the motor control laws 24 may be configured to determine whether a jam is imminent or is currently occurring based on received input and knowledge of, or information or data pertaining to, the motor 14 and/or the actuator 16. If a jam is predicted or detected, the controller 12 may be configured to reduce the torque of the motor 14 (e.g., relative to a present torque, relative to a master commanded torque, or otherwise). For example, without limitation, in an embodiment, the controller may be configured to adjust the output torque of the motor 14 to maintain the force of the EMA 16 below about 14,300 pounds. In the same or another embodiment, the controller 12 may be configured to maintain the output torque of the motor 14 under about 7.4 inch-pounds.

The controller 12 and the motor control laws 24 may be embodied in one or more of hardware, software, field-programmable gate arrays (FPGAs), and other known processing devices and apparatuses. Furthermore, though illustrated as embodied in a unitary controller 12, the controller 12 and the motor control laws 24 may be implemented in one or more devices, components, or apparatuses. Furthermore, in an embodiment, the motor control laws 24 may form part of a broader control scheme for multiple motors, hydraulic components, electrical components, actuators, and/or other known devices and systems. The entirety of such a control scheme may be implemented in a unitary controller, in an embodiment, or in multiple devices or apparatuses.

FIG. 2 is a block diagram view of two portions 26, 28 generally illustrating an embodiment of the motor control laws 24. The two motor control law portions 26, 28 may form a part of a broader control scheme for a motor 14 (i.e., the motor control laws 24 shown in FIG. 1 may not be limited to the two motor control law portions 26, 28 of FIG. 2). The motor control law portions 26, 28 may be referred herein as "modules" for ease of description. It should be understood, though, that multiple motor control law modules may be embodied in the same or different hardware, software, or other programming device or apparatus.

The motor control law portions 26, 28 will be described below, for ease of description, with reference to an embodiment in which the motor control law portions 26, 28 are part of motor control laws 24 for a single motor 14 driving a single electromechanical actuator 16 (e.g., the embodiment shown in FIG. 1). The motor control law portions 26, 28 may, however, be adapted for use with multiple motors and/or actuators and with other types of actuators (e.g., hydraulic). Accordingly, the motor control law portions 26, 28 are not limited to the embodiments shown and described herein.

Referring to FIGS. 1 and 2, a first, Active Force-Torque Control (AFTC) motor control law portion 26 (which may be referred to herein as the AFTC module 26) may be configured to receive, as input, the current position of the actuator 16 and the master commanded movement direction of the actuator 16, and the master commanded rate of movement of the actuator 16. The AFTC module 26 may be configured to store or receive as input (and, therefore, "know") the range of motion of the actuator 16 including, but not limited to, the ends of the range of motion (movement to either of which may correspond to a hard jam).

Based on the actuator position, the master commanded movement, and the AFTC module's knowledge of the range of motion of the actuator 16, the AFTC module 26 may be configured to determine if a hard jam (i.e., end of motion impact) is imminent or is occurring. For example, the AFTC module 26 may compare the master commanded rate and direction of actuator movement to the amount of movement remaining between the actuator position and the end of the range of motion. Such a comparison may involve, in an embodiment, reference to a look-up table or algorithm for determining what commanded movement is likely to result in a hard jam if preventative action (i.e., reducing motor torque, speed, etc.) is not taken.

The AFTC module 26 may also be configured to determine the proper speed (e.g., in RPM) for the motor 14 to achieve the master commanded actuator movement. Accordingly, the AFTC module 26 may be configured to store or receive as input (and, therefore, "know") information about the motor 14 and actuator 16 for converting a direction and rate into a measure of motor speed.

In an embodiment, an AFTC module 26 may output a motor speed command (shown as "Motor RPM Command" in FIG. 2) and a pre-impact detection. The motor speed command may be based on the master commanded direction and rate of movement received by the AFTC module 26 and the AFTC module's knowledge of the actuator 16 and motor 14. If the AFTC module 26 does not determine that a hard jam is imminent or occurring, the motor speed command may simply be the motor speed necessary to achieve the master movement command received by the controller 12. If, on the other hand, the AFTC module 26 determines that a hard jam is imminent or is occurring, the motor speed command may be less (i.e., the speed commanded by the controller 12 may be less) than that required to achieve the master movement command received by the controller 12.

The pre-impact detection output of the AFTC module 26 may include, for example, one or more of a binary (i.e., YES/NO) indication of an imminent hard jam, a binary indication of an occurring hard jam, an amount of time or amount of movement until a hard jam, or some other data related to or resulting from the AFTC module's comparison of the master commanded movement to the actuator's range of motion and resulting hard jam determination.

A second, Motor Torque Control (MTC) motor control law portion 28 (which may be referred to herein as the MTC module 28) may be configured to receive, as input, the motor speed command and pre-impact detection from the AFTC module 26 as well as a measured motor speed (e.g., in RPM), a measured motor electrical current, and a temperature. Based on one or more of such inputs, the MTC module 28 may calculate and output a motor torque command. The motor torque command may be, in an embodiment, one of several commands within the motor control laws 24 that are used to develop the drive signal for the motor 14 (including, in an embodiment, commands from other portions of the motor control laws 24 that are not shown in FIG. 2).

The AFTC module 28 may also be configured to determine if a soft jam is imminent or is occurring. As noted above, a soft jam may occur when the actuator is jammed within its range of motion because of a misalignment, a mechanical fault in the actuator, or some other mechanical issue. The AFTC module 28 may be configured, in an embodiment, to examine the measured motor current, measured motor speed, and pre-impact detection (which, as noted above, is indicative of a hard jam) to determine if a jam is imminent or is occurring that is other than a hard jam.

Like the AFTC module 26, the MTC module 28 may be configured to store or receive as input (and, therefore, "know") information about the motor 14 and actuator 16. The AFTC module 26 may use such knowledge to determine an appropriate motor torque. The appropriate torque may be, if a hard or soft jam is not imminent or occurring, the torque necessary to achieve the master commanded movement provided that such torque is within a safe operational range of the motor 14. On the other hand, if a hard or soft jam is imminent or occurring, the appropriate motor torque may be less (i.e., may command a lower torque) than that necessary to achieve the master commanded movement. For example, the appropriate torque may be zero in the event of an imminent or occurring jam.

The motor torque command output by the MTC module 28 may reflect the appropriate torque determined by the MTC module 28. The motor torque command may include a target torque, an adjustment to the torque necessary to achieve the master commanded movement, and/or some other torque indication or value.

The motor torque command output by the MTC module 28 may effectively perform the same function as a mechanical torque brake—i.e., reduce the torque output by the motor 14 to the actuator 16. By implementing this functionality in the electronic motor control laws 24 rather than with a mechanical component may reduce the weight of the system 10. Furthermore, because the MTC module 28 may know the effect of temperature and other environmental conditions on the output torque of the motor 14, implementing torque reduction in electronic control laws 24 allows for more precise control of torque reduction that accounts for environmental effects.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the claims and their equivalents.

What is claimed:

1. A method for controlling a motor coupled with an electromechanical actuator (EMA), comprising:
   receiving, from one or more sensors coupled with said motor or said EMA, an indication of a speed of said EMA and a position of said EMA;
   determining whether a jam of said EMA is imminent or is occurring according to the EMA speed, EMA position, and a known range of motion of said EMA, wherein the determining includes comparing a master commanded rate and a movement direction of said EMA to an amount of movement remaining between the EMA position and an end of the EMA range of motion; and
   providing an input signal, in response to the determination, to said motor to reduce a torque of the motor if the jam of said EMA is imminent or is occurring.

2. The method of claim 1, further comprising providing the input signal to said motor to maintain the output torque of said motor under about 7.4 inch-pounds.

3. The method of claim 1, further comprising altering the input signal to said motor to maintain the force of said EMA below about 14,300 pounds.

4. The method of claim 1, further comprising receiving an indication of an electrical current of said motor, wherein the determining whether a jam of said EMA is imminent or is occurring is performed further according to the electrical current.

5. The method of claim 1, wherein the EMA is coupled to an aircraft flap.

6. The method of claim 1, wherein one or more of the sensors are coupled to the EMA.

7. The method of claim 1, wherein one or more of the sensors are coupled to the motor.

8. A system for controlling a motor coupled with an electromechanical actuator (EMA), comprising:
   a controller, configured to be coupled with a motor, the motor coupled with an EMA, the controller configured to:
   receive, from one or more sensors coupled with said motor or said EMA, an indication of a speed of said EMA and a position of said EMA;
   determine whether a jam of said EMA is imminent or is occurring according to the EMA speed, EMA position, and a known range of motion of said EMA; and
   provide, in response to the determination, an input signal to said motor to reduce a torque of said motor if the jam of said EMA is imminent or is occurring,
   wherein the controller is configured to determine whether the jam of said EMA is imminent or is occurring by comparing a master commanded rate and a movement direction of said EMA to an amount of movement remaining between the EMA position and an end of the EMA range of motion.

9. The system of claim 8, wherein the controller is further configured to provide said input signal to said motor to maintain the output torque of said motor under about 7.4 inch-pounds.

10. The system of claim 8, wherein the controller is further configured to alter said input signal to said motor to maintain the force of said EMA below about 14,300 pounds.

11. The system of claim 8, wherein the controller is further configured to receive an indication of an electrical current of said motor, wherein the controller is configured to determine whether a jam of said EMA is imminent or is occurring further according to the indication of the electrical current.

12. The method of claim 8, wherein the EMA is coupled to an aircraft flap.

13. A system comprising:
an electromechanical actuator (EMA);
a motor configured to drive the EMA; and
a controller, coupled to the motor, configured to receive a speed of the EMA and a position of the EMA, to determine whether a jam of the EMA is imminent or is occurring according to the EMA speed, EMA position, and a known range of motion of the EMA, and to provide an input signal, in response to the determination, to the motor to reduce a torque of the motor if the jam of the EMA is imminent or is occurring, wherein the controller is configured to determine whether the jam of said EMA is imminent or is occurring by comparing a master commanded rate and a movement direction of said EMA to an amount of movement remaining between the EMA position and an end of the EMA range of motion.

14. The system of claim 13, wherein the EMA is coupled to an aircraft flap.

15. The system of claim 13, further comprising one or more sensors configured to detect, and to provide for the controller, the EMA speed and EMA position.

16. The system of claim 15, wherein one or more of the sensors are coupled to the EMA.

17. The system of claim 15, wherein one or more of the sensors are coupled to the motor.

18. The system of claim 13, wherein the controller is further configured to receive an electrical current of the motor and to determine whether a jam of the EMA is imminent or is occurring further according to the electrical current.

19. The system of claim 13, wherein the controller is further configured to provide said input signal to said motor to maintain the output torque of said motor under about 7.4 inch-pounds.

20. The system of claim 13, wherein the controller is further configured to alter said input signal to said motor to maintain the force of said EMA below about 14,300 pounds.

\* \* \* \* \*